Figure 4:
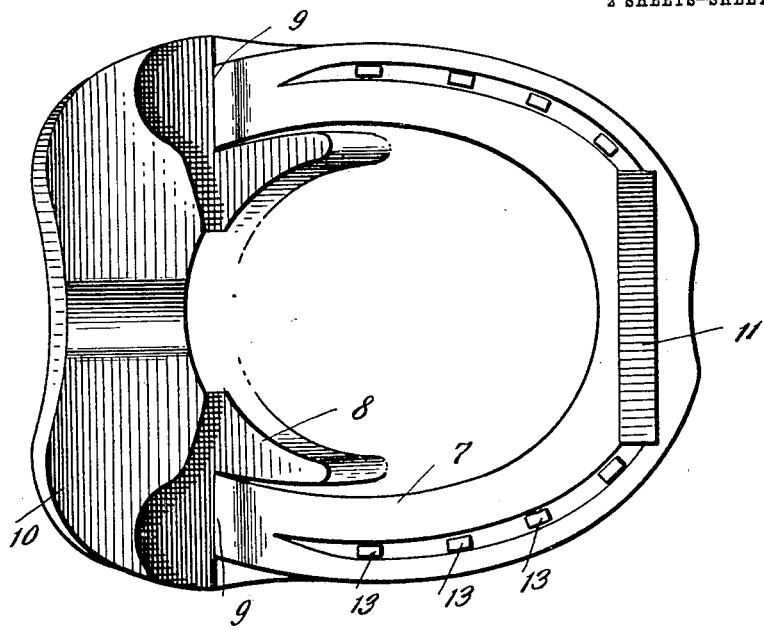

R. WHITAKER.
OVERSHOE FOR HORSES.
APPLICATION FILED DEC. 13, 1912.
1,085,312.
Patented Jan. 27, 1914.
2 SHEETS—SHEET 1.
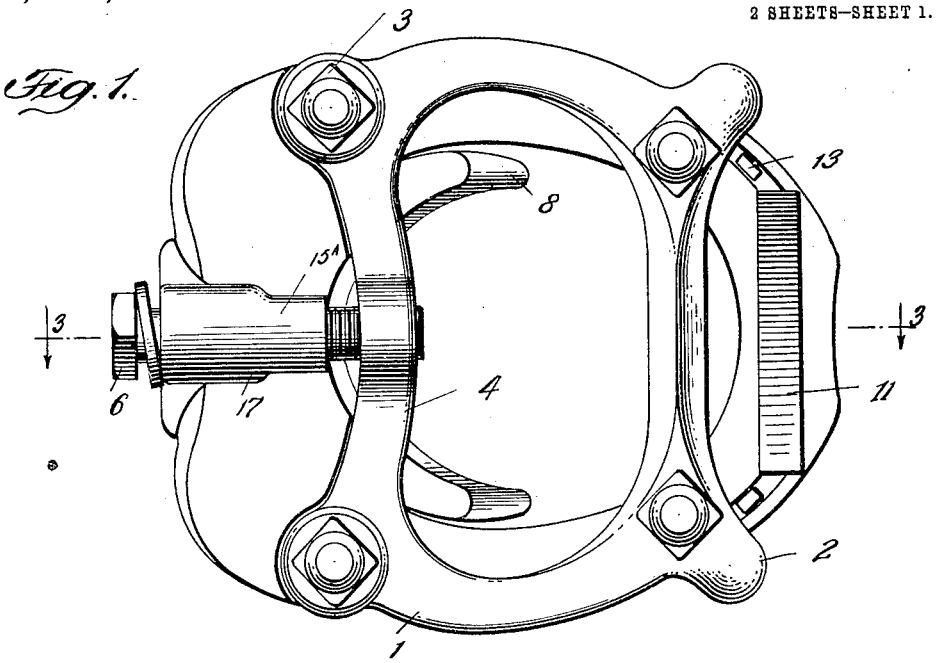
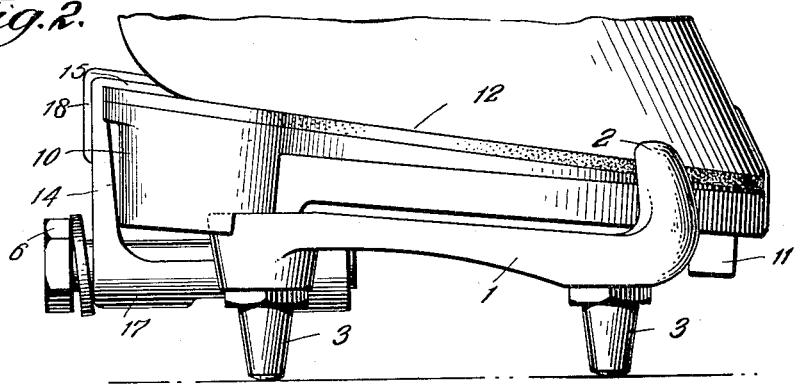
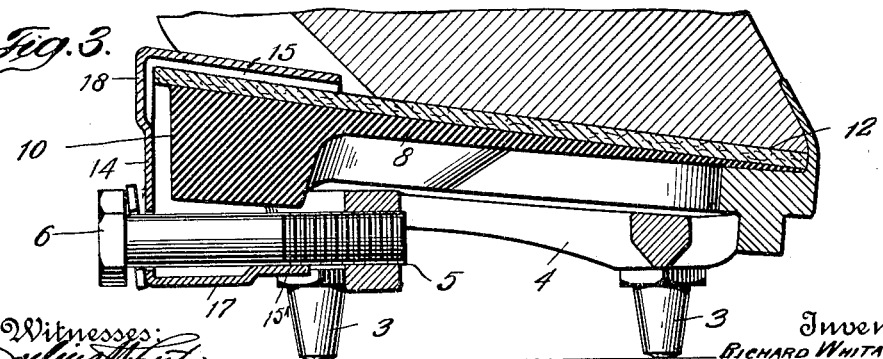
Witnesses:
Inventor
RICHARD WHITAKER
By his Attorney

R. WHITAKER.
OVERSHOE FOR HORSES.
APPLICATION FILED DEC. 13, 1912.

1,085,312.

Patented Jan. 27, 1914.
2 SHEETS—SHEET 2.

Witnesses:

Inventor
RICHARD WHITAKER.
By his Attorney

UNITED STATES PATENT OFFICE.

RICHARD WHITAKER, OF NEW BRUNSWICK, NEW JERSEY, ASSIGNOR TO THE EMERGENCY HORSESHOE COMPANY, OF NEW BRUNSWICK, NEW JERSEY, A CORPORATION OF NEW JERSEY.

OVERSHOE FOR HORSES.

1,085,312. Specification of Letters Patent. Patented Jan. 27, 1914.

Application filed December 13, 1912. Serial No. 736,455.

*To all whom it may concern:*

Be it known that I, RICHARD WHITAKER, a citizen of the United States, residing at New Brunswick, in the county of Middlesex and State of New Jersey, have invented new and useful Improvements in Overshoes for Horses, of which the following is a specification.

This invention relates to overshoes for horses and comprises an overshoe plate or tread section adapted to contain anti-slipping calks in combination with a peculiar fastening device consisting of means for securing the overshoe securely to the bottom of the usual rubber-padded horseshoe.

It is a common expedient in the art to which the present invention relates to provide overshoes having calks and fastening means for securing such overshoes to the usual horseshoe. In some instances these fastening means are straps or chains adapted to be secured around the hoof, while in other instances clamping means engaging the front of the usual horseshoe and additional clamping means engaging with the heels thereof coöperate to secure such overshoes in position.

My invention is particularly useful in connection with the tread sections of overshoes adapted for use with locking means of the class last described. It provides means whereby such overshoe tread sections may be securely attached to rubber-padded horseshoes. The usual rubber or other padded horseshoe now on the market comprises smaller shoe portions than those in which heel calks are used, the heels of such rubber-padded shoes not extending the length of the hoof, but, on the contrary, terminating at a point approximately two-thirds of the distance across the bottom of the hoof. There is usually provided a section of rubber or other resilient material having a portion thereof extending between the hoof and the shoe and a further depending or tread portion extending below and behind the shoe at the point where the heels terminate, thus affording a soft and yielding tread surface in the place of the usual steel calks of horseshoes. This rubber pad is usually secured in place by the nails which are used for fastening the shoe to the hoof.

The usual clamping means for horse overshoes cannot be advantageously used in connection with rubber-padded horseshoes because the heels of such shoes do not extend back of the frog of the hoof.

Therefore, it is an object of my invention to provide an overshoe which may be used in connection with rubber-padded horseshoes and one which is particularly strong, durable and efficient, and at the same time relatively cheap in manufacture.

It is a further object of my invention to provide a clamping device for use in combination with the tread or plate sections of the usual overshoes now on the market and for use in connection with the ordinary horseshoe, and to this end I provide a locking device constructed in such manner that it may be substituted for the usual bolt or clamping means used in connection with the tread sections of overshoes above referred to, such, for instance, as the overshoe shown in United States patent to Oscar F. Peterson, No. 924,580, June 8th, 1909.

With the above and other objects in view, my invention comprises a clamp or fastening member arranged to lock an overshoe tread section to a padded horseshoe and may be advantageously employed in connection with an overshoe tread section having the usual forward cleats for engaging the front of a horseshoe and means toward the rear for coöperating with a fastening device. The clamp comprises a section of metal having a forwardly and preferably downwardly extending upper arm, a forwardly extending preferably tubular lower arm, arranged to coöperate with a bolt or other fastening means and a back section against which the bolt or fastening means may be drawn to clench the overshoe in place. The forwardly extending arm preferably terminates at a point approximately in vertical line above the means on the tread which coöperate with the bolt or fastening means. The arms may be of any desired shape to accomplish the end in view, but I have shown them flat and plate-like in this illustration of my invention.

Figure 6:
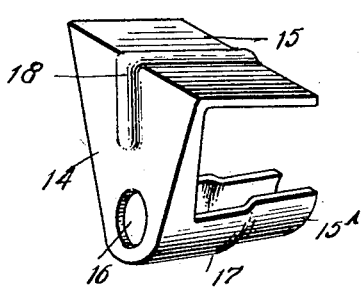
Figure 5:
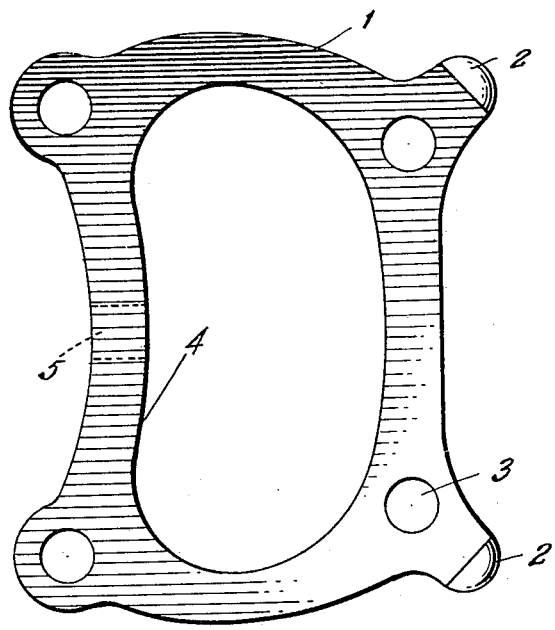

In the accompanying drawings showing one form of a specific embodiment of my invention, and in the several views of which similar reference numerals designate corresponding parts, Figure 1 is a bottom plan view of my combined overshoe and locking device attached to a rubber-padded horseshoe; Fig. 2 is a side elevation of the same; Fig. 3 is a vertical section along line 3—3 of Fig. 1; Fig. 4 is a bottom plan view of the ordinary rubber-padded horseshoe without the device of my invention attached; Fig. 5 shows a top plan view of an overshoe plate or tread section with which my invention is combined; Fig. 6 is a detail in perspective of the locking section of my device with the bolt removed.

Referring to the drawings, reference numeral 1 indicates the overshoe tread section, which, as before stated, may be of the type set forth in the Peterson Patent No. 924,580, or any other type adapted for the purposes in view. It is provided with the usual cleats or clamps 2 for fastening to the front portion of a horseshoe and hoof and the permanent or removable calks 3, which may be of any desired type.

4 designates the transverse bar at the rear of the overshoe having the screw-threaded hole 5 for the reception and retention of the fastening means here shown as a bolt 6 on the clamp.

The horseshoe 7, used in connection with the rubber pad 8, is not provided with heel calks, but the heels 9 thereof terminate at a point some distance from the frog of the hoof and are in engagement with the heel 10 of the rubber pad 8, which extends considerably below the heels 9 approximately on a level with the toe calk 11 of the horseshoe. The leather pad 12 serves to protect the rubber heel from the upper locking plate or arm, as hereinafter more fully pointed out. This leather pad, the rubber pad and the horseshoe are all securely fastened to the hoof by means of the usual nails 13.

The clamping device of my invention adapted for use in combination with the overshoe consists of a yoke or clamping member 14, having a slightly downwardly and inwardly extending arm or plate 15, preferably terminating, while in position, at a point approximately directly over the transverse bar 4 of the overshoe. The yoke 14 is further provided with a tubular arm or extension 15ª, presenting a groove for the reception of locking bolt 6 and a hole designated by 16 through which this bolt may be inserted for engagement with the transverse bar 4, as above pointed out. The head of the bolt engages directly with the metal around the hole 16 on the back of the clamp and serves to draw and hold the clamping device securely in position.

To strengthen the clamp, I provide the reinforcement 18 extending on arm 15 to the forward edge thereof and approximately half way down the back 14. This reinforcement may be formed in the same operation in which the clamp itself is made and preferably consists of the stamped-out portion forming a rib, as shown.

Upon assembling the parts the arm 15 of the locking device is drawn forward and contacts with the top of the pad, being first bent at the correct angle with respect to the back portion if necessary. The bolt is threaded into the bar of the overshoe and draws the whole clamp forward and the overshoe backward against the horseshoe. The tendency for the overshoe to draw away from the horseshoe is overcome by the upper arm. The bolt engages the extremity 15ª of the lower arm and thus prevents the clamp tilting and the arm 15 from being drawn away from the pad.

The operation of the device is obvious from the above description. If deemed desirable, a split washer, serving as a lock-nut or the equivalent, may be provided between the bolt head and the face of the yoke 14, and I have found in actual practice that use of such lock-nut is desirable. I have also found it desirable to enlarge the arm 15ª as shown at 17, to allow a slight play between the bolt and arm for firmer clamping.

Of course, it is to be understood that my invention is not to be limited to the particular embodiment herein set forth and I consider myself entitled to any improvements or modifications embodying the essential features of my invention. I believe I am the first to provide simple, efficient and inexpensive clamping means operable exclusively under the hoof for securing an overshoe tread to a rubber-padded and rubber heel horseshoe and the first to provide locking means for the above purpose, which may be used in combination with the tread plates of overshoes now on the market.

What I claim is:—

1. The combination with a horseshoe having a rubber pad and an overshoe comprising a tread section having means for coöperating with a fastening device, of a clamp arranged to be secured over top of the pad of the horseshoe and to said coöperating means and provided with a fastening device for securing the clamp to the tread section of the overshoe.

2. The combination with an overshoe for padded horseshoes, comprising a tread section having means for coöperating with a fastening device, of a clamp provided with a downwardly extending arm arranged to be secured over top of the pad of the horseshoe, a second arm arranged to be secured under the pad, and a fastening device coöperating with said second arm for securing the clamp to said coöperating means.

3. The combination with an overshoe for padded horseshoes, comprising a tread section having transverse means for coöperating with a fastening device, of a clamp provided with an arm having an end approximately parallel to said transverse coöperating means when in position and arranged to be secured over top of the pad of the horseshoe substantially in line with said transverse coöperating means, and having also a second arm arranged to be secured under the pad, and a fastening device coöperating with said second arm for securing the clamp to said coöperating means and thus locking the overshoe in position.

4. The combination with an overshoe for padded horseshoes, comprising a tread section having means for coöperating with a fastening device, of a clamp provided with an arm arranged to terminate at a point approximately over said coöperating means, and having a second arm arranged to be secured under the pad, and a fastening device for securing the clamp to said coöperating means of the tread section and thus locking the overshoe in position.

5. The combination with an overshoe for padded horseshoes, comprising a tread section having means for coöperating with a fastening device, of a clamp having an upper downwardly slanting arm arranged to be secured over the rubber pad, a lower arm arranged to be secured under the pad, a back portion connecting the upper and lower arms, and a fastening device coöperating with said upper and back portions to secure the clamp to said coöperating means of the tread section and to prevent said upper arm from being drawn away from the top of the pad.

6. The combination with an overshoe for padded horseshoes comprising a tread section having means for coöperating with a fastening device, of a clamp provided with a forwardly extending plate-like arm arranged to terminate at a point approximately over such co-operating means and having a second forwardly extending tubular arm arranged to be secured under the pad, and a fastening device for securing the clamp to said coöperating means of the tread section and to thus lock the overshoe in position.

RICHARD WHITAKER.

Witnesses:
FRED M. JOINER,
P. L. VAN RINK.

Copies of this patent may be obtained for five cents each, by addressing the "Commissioner of Patents, Washington, D. C."